United States Patent Office 3,206,035
Patented Sept. 14, 1965

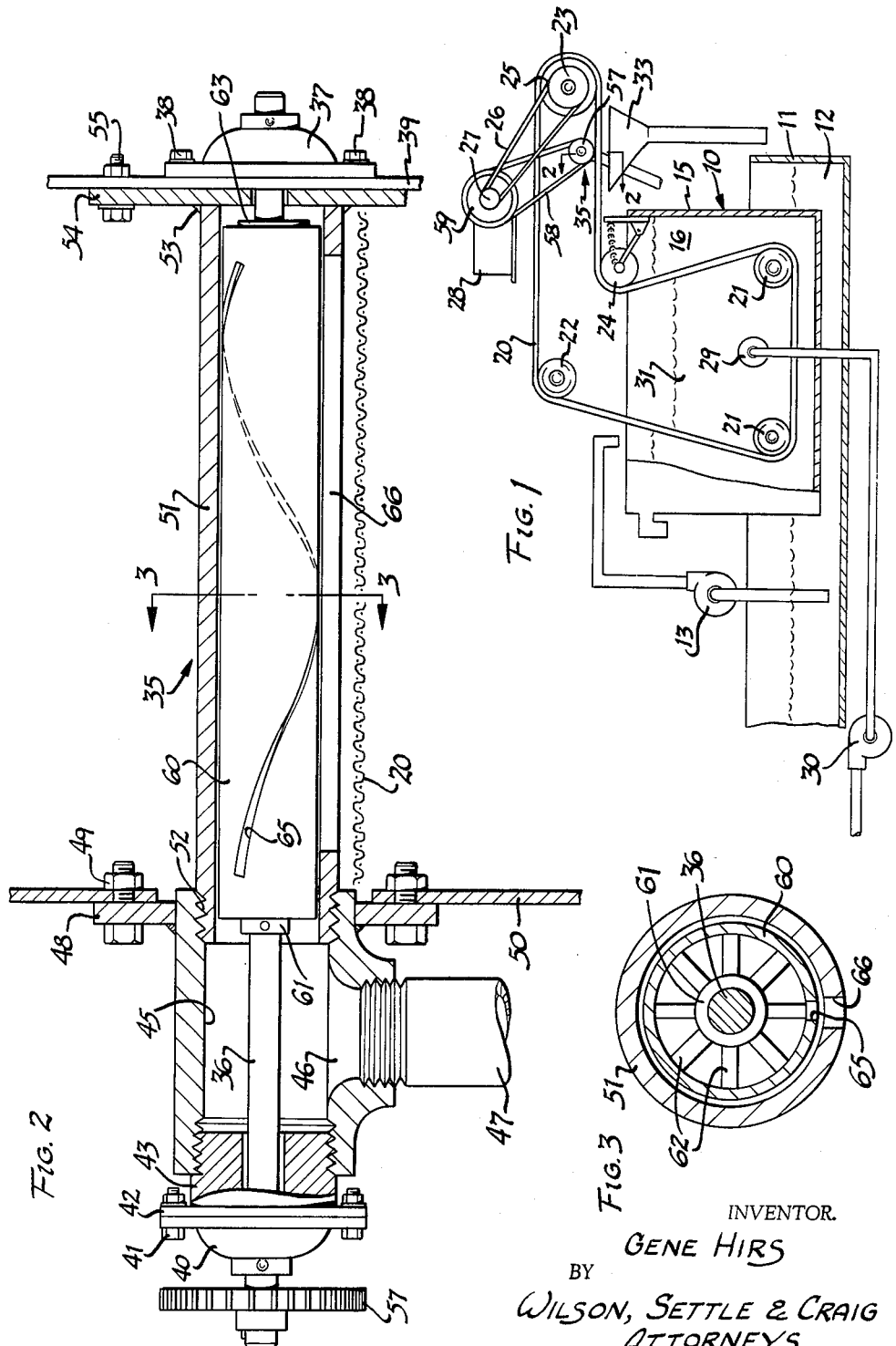

3,206,035
FILTER CLEANING MECHANISM
Gene Hirs, 17208 Greenview, Detroit, Mich.
Filed May 28, 1962, Ser. No. 198,183
1 Claim. (Cl. 210—391)

The present invention relates to an apparatus for cleaning perforate filter media of accreted contaminants. More particularly, the present invention relates to an apparatus for directing a concentrated, high pressure jet of fluid under pressure against a filter medium to remove contaminants therefrom, the fluid jet being moved relative to the medium to insure the complete removal of such contaminants.

In my earlier filed applications, Serial No. 178,338, filed March 8, 1962, and Serial No. 187,890, filed April 16, 1962, now abandoned, I have disclosed a traveling screen filter and a method of filtration wherein the filter medium is a foraminous or perforate screen in the form of an endless belt trained about a plurality of supporting rollers and movable continuously or intermittently through a closed path. A portion of the traveling screen dips into a body of contaminated liquid and a clean liquid or filtrate pump has its intake disposed interiorly of the closed loop. Since the traveling screen edges are in sealing contact with the side walls of the contaminated liquid container, liquid is forced through the filter medium by the flow induced through the filtrate or clean liquid pump intake.

The screen travels in its closed loop, either intermittently or continuously, and that portion of the screen upon which the contaminant has accreted by flow of liquid through the screen is subsequently removed from the contaminated liquid. The contaminant must be removed from the screen prior to re-entry of the screen into the contaminated liquid in order that effective filtering operation can be obtained.

Conventionally, such cleaning is accomplished by merely directing air, steam, or some similar cleaning fluid through a perforated pipe disposed interiorly of the screen loop. The cleaning fluid is thus directed outwardly through the screen and forces the contaminant particles from the exterior surface of the screen.

Of course, in any given installation there is available only a limited amount of air under pressure or, more particularly, only a limited amount of steam. Consequently, the utilization of a continuous opening or a series of apertures across the entire width of the screen through which the fluid is introduced onto the screen results in the low pressure flow of fluid through the screen. Thus, the contaminant-loosening power of the fluid is rather severely limited. In order to increase contaminant loosening power of the fluid stream, it is, of course, necessary to materially increase the amount of fluid under pressure utilized. As a consequence, adequate cleaning of the screen has constituted a substantial expense in the operation of filters of this type.

The present invention now provides a new, novel and extremely useful screen cleaning apparatus which provides a restricted, high velocity, high pressure jet of fluid which is directed specifically against a restricted portion of the perforate filter medium and which is traversed rapidly across the entire width of the filter medium in order to loosen and remove contaminant from the exterior surface thereof.

The structure which is utilized is quite simple and merely includes a pair of concentric, relatively rotatable slotted elements, one of the elements having an arcuate or peripheral slot therein oriented so that only a portion thereof registers with an axial slot in the other of the elements. The cleaning fluid is supplied to the inner of the elements for flow through only the registering portions of the slots against the filter medium. By rotating one of the members, the point of registry of the slots is constantly changed and, in effect, the jet of fluid under pressure sweeps transversely across the entire width of the filter medium. By rapidly relatively rotating the two slotted members, rapid traversing of the fluid jet can be obtained, and substantially all of the relatively slower traveling filter medium can be subjected to action of the cleaning fluid.

The present invention contemplates supplying fluid under pressure to a portion of the filter medium bearing accreted contaminant, confining the fluid to a high pressure jet directed through the medium against the contaminant and rapidly traversing the jet across the width of the medium to effectively sweep substantially all of the medium with the cleaning jet.

It is, therefore, an important object of the present invention to provide a new and improved apparatus for cleaning a perforate filter medium having accreted contaminant particles thereon by directing a confined high pressure jet of cleaning fluid through the medium and moving the jet relative to the medium to insure substantially complete cleaning thereof.

Another important object of the present invention is the provision of an apparatus for cleaning a perforate filter medium by means of an extremely simple apparatus including a pair of concentrically rotatable tubular elements having registrable apertures through which a cleaning fluid supplied to the inner of the elements can escape against the adjacent filter medium, the elements being relatively rotated to vary the location of registration of the apertures across the width of the medium.

It is a further object of this invention to provide a system for filtering contaminant particles from the liquid by passing the liquid through a perforate filter medium to accrete contaminant particles at the surface of the medium and cleaning such accreted contaminant particles from the medium by means of a high pressure jet of cleaning fluid rapidly movable across the width of the filter medium to remove the contaminant particles therefrom.

It is still another, and no less important, object of the present invention to provide an improved filter mechanism incorporating therein a perforate filter medium which is cleaned of accreted contaminant by a cleaning fluid flowing under pressure through an outlet opening defined by a pair of concentric and relatively rotatable elements provided with registering flow apertures effectively traversing the entire width of the filter medium.

Other objects of this invention will appear in the following description and appended claim, reference being had to the accompanying drawings forming a part of this specification wherein like reference characters designate corresponding parts in the several views.

On the drawings:

FIGURE 1 is a schematic representation of a filtering apparatus provided with a cleaning mechanism of the present invention capable of carrying out the cleaning method of the present invention;

FIGURE 2 is an enlarged sectional view taken along the plane 2—2 of FIGURE 1 and more particularly illustrating the cleaning mechanism;

FIGURE 3 is a sectional view taken along the plane 3—3 of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

FIGURE 1 is a schematic representation of the type of filter apparatus illustrated in greater detail in my above-identified and copending applications Serial Nos. 178,338 and 187,890. More specifically, the apparatus 10 of FIGURE 1 includes a lower drain tank 11 containing a body 12 of contaminated liquid adapted to be elevated, as by pump 13, to a filter tank 15. This filter tank 15 thus contains a body 16 of contaminated liquid.

A perforate filter medium 20, preferably in the form of a closed loop formed of a woven stainless steel wire or the like is disposed so that the one portion of the filter medium dips into the body 16 of contaminated liquid within the tank 15. More particularly, the perforate filter medium 20 is supported on a plurality of idler support rolls 21 disposed well below the level of the contaminated liquid body 16, while an upper idler support roll 22 disposed above the tank also supports the filter medium. The remainder of the closed loop is defined by a driven support roll 23 disposed above and to one side of the tank 15 and by a spring urged tension roll 24 carried by the tank 15 above the level of the body 16 of liquid therein. The roll 23 is driven by a suitable means, as by a sprocket 25 co-rotatable with the roll 23, a drive chain 26 lapping the sprocket 25 and a drive sprocket 27 driven by the output shaft of a motor and speed changer drive mechanism 28.

Disposed within that portion of the looped filter medium 20 lying within the body 16 of contaminated liquid is the intake 29 of a filtrate pump 30 which directs filtrate from the body of filtrate or filtered liquid 31 interiorly of the looped filter medium 20 to the point of use, as to a series of spray nozzles or the like. Such spray nozzles and ancillary apparatus is well illustrated in my above-identified copending application Serial No. 178,338.

As best illustrated in FIGURES 1 and 2, there is disposed, within the loop of the filter medium 20 and at a position intermediate the tension roll 24 and the drive roll 23, a filter medium cleaning mechanism indicated generally at 35. This mechanism 35, as will be hereafter more fully explained in detail, is effective to direct cleaning fluid, such as air, steam or the like through the perforate filter medium 20 to remove therefrom accreted contaminant particles deposited upon the exterior surface of the filter medium by the flow of liquid from the body 16 of contaminated liquid into the body 31 of clean liquid or filtrate. A disposal chute 33 is provided generally beneath that portion of the filter medium 20 through which the cleaning fluid is directed by the cleaning mechanism 35.

As best illustrated in FIGURE 2 of the drawings, the cleaning mechanism 35 comprises an axially extending, driven shaft 36 supported at one end in a bearing 37 secured, as by cap screws 38, to a housing side plate 39 forming a portion of the housing enclosing the filter medium 20. The shaft 36 is supported at its other end in a second, similar bearing 40 secured, as by nuts and bolts 41, to a flange 42 of a threaded end plug 43 which projects axially into and closes the adjacent end of an open ended, internally threaded nipple 44. The interior 45 of this nipple 44 communicates through an aperture 46 with a cleaning fluid supply pipe 47 connected at its remote end to a suitable source of cleaning fluid, such as air under pressure, steam, or the like. The other open end of the nipple 44 is surrounded by a mounting flange 48 attached by suitable means, as by nuts and bolts 49, to the other side sheets or plates 50 of the housing enclosing the filter medium 20.

Projecting between the side sheets 39 and 50 and across the entire transverse extent of the filter medium 20 is a cylindrical housing 51 having one end threaded, as at 52, into the nipple 44 and having its other end attached permanently, as by welding indicated at 53, to a mounting flange 54 secured, as by nuts and bolts 55 to the housing side sheet 39. It will be appreciated that the nipple 44 and the housing 51 are retained against rotation by their mounting flanges 48 and 54, respectively, and that the shaft 36 is freely rotatable within the nipple 44 and the housing 51 by virtue of its being journaled in the bearings 37 and 40.

That end of the shaft 36 projecting freely beyond the bearing 40 has secured thereto for rotation therewith a drive sprocket 57 lapped by a drive chain 58, which, in turn, laps a relatively large drive sprocket 59 of the motor-speed reducer unit 28. Mounted upon the shaft 36 and co-rotatable therewith is a generally cylindrical sleeve 60, this sleeve 60 being secured to the shaft by means of a collar 61 co-rotatable with the shaft and having a plurality of radial spokes 62 secured to the inner periphery of the sleeve. The other end of the sleeve is closed by means of a solid plug or flange 63 secured to the shaft and to the inner periphery of the sleeve. It will be appreciated that the spokes 62 provide for the free flow of cleaning fluid from the nipple chamber 45 into the sleeve 60.

The sleeve 60 is provided with a peripheral slot 65 having an arcuate or peripheral extent of 360° and extending radially completely through the sleeve to afford egress for the cleaning fluid introduced thereinto. The housing 51 is provided with a linear, axially extending slot 66 located to directly overlie the filter medium 20. Since the sleeve 60 fits snugly within the housing 51, it is obvious that cleaning fluid under pressure interiorly of the sleeve can escape therefrom only through the slots 65 and 66, or more particularly only through the registering portions of these slots.

It will be particularly noted that the slot 65 in the sleeve 60 is arcuate and, in the illustrated form of the invention, covers an arcuate extent of 360° between its axial extremities. Thus, as the sleeve 60 is rotated, separate axial portions of the slot 65 will be brought into registry with the slot 66, this progressive registration of the slots extending from one end of the sleeve 60 to the other end of the sleeve 60 as the sleeve is rotated. As a result, the cleaning fluid under pressure within the sleeve will escape through the progressively registering portions of the slot 65 and will traverse the slot 66 from one end to the other.

As above noted, the sleeve 60 fits snugly within the housing 55 in a close running relation and it is not necessary to seal the sleeve 60 within the housing 51 against the escape of cleaning fluid under pressure therebetween, since any such escaped cleaning fluid can only pass through the housing slot 66 and thereby be directed against the cleaning medium. Of course, to obtain the desired high-speed jet of cleaning fluid, it is preferable that the escape of such cleaning fluid without passage through the sleeve 60 be held to a minimum.

In effect, the cleaning fluid under pressure is confined by the slots 65, 66 into a high pressure jet which is directed through the slot 66 against the inner surface of the filter medium. This jet rapidly traverses across the width of the medium as the sleeve 60 is rotated to blow contaminant particles from the exposed outer surface of the filter medium. It will be noted that the effect of the large driving sprocket 59 and the relatively small driven sprocket 57 will be to drive the sleeve 60 at a high speed, while the effect of the small driving sprocket 27 and the large driven sprocket 25 for the filter medium drive roll 23 will be to advance the filter medium relatively slowly. For example, the medium 20 is driven at a linear speed of from 1 to 3 feet per minute, and the sleeve 60 is driven at a speed to completely traverse the width of the medium for each one-quarter inch advancement of the medium. Thus, the cleaning jet resulting from the progressive registration of the slots 65 and 66 will rapidly traverse the cleaning medium at quite closely spaced intervals along the length of the filter medium and substantially all of the filter medium will be subjected to the jet of cleaning fluid. It has been found in actual operation that extremely efficient cleaning operation results from the quite simple structure of this invention.

I claim:

In a filter mechanism wherein a perforate filter medium travels in a closed loop, a first portion of said loop being immersed in a body of contaminated liquid from which contaminant accretes onto one surface of the medium and a second portion of said loop lying outside said body of liquid, said medium being horizontally positioned in said second loop portion such that said one surface of the medium and the accreted contaminant thereon faces downwardly, means for removing such accreted contaminant comprising a fixed generally tubular horizontal housing disposed interiorly of the second loop portion, said housing traversing the width of said medium and having a downwardly opening axial slot therein, the slot being axially coextensive with and closely overlying the filter medium surface opposing said one surface, a rotatable inner sleeve coaxially disposed in said housing and having a slot therein angularly related to the slot in said housing and of an axial extent substantially the same as that of said housing slot, substantially less than the entire length of said sleeve slot registering with said housing slot at any given time, means for rotating said sleeve, means for supplying fluid under pressure to said sleeve for escape downwardly through the registering portions of said slots as a high velocity fluid stream impinging upon and passing through the medium, and receiving means located beneath said one surface of said second loop portion in substantial vertical alignment with said housing to receive the high velocity fluid stream and any contaminants suspended therein.

References Cited by the Examiner

UNITED STATES PATENTS

| | | | |
|---|---|---|---|
| 880,742 | 3/08 | Kelly | 210—82 |
| 2,516,680 | 7/50 | Culpepper | 210—400 X |
| 2,681,153 | 6/54 | Armbrust | 210—82 |
| 2,796,146 | 6/57 | Hersey et al. | 55—294 |
| 2,848,113 | 8/58 | Paterson et al. | 210—393 |
| 2,911,098 | 11/59 | Leithiser | 210—107 |
| 3,012,677 | 12/61 | Hungate | 210—107 |

FOREIGN PATENTS 221,109  10/61  Austria.

REUBEN FRIEDMAN, *Primary Examiner.*